(12) United States Patent
Rupp et al.

(10) Patent No.: US 9,353,684 B2
(45) Date of Patent: May 31, 2016

(54) AIRCRAFT ENGINE AIRFLOW MODULATION APPARATUS AND METHOD FOR ENGINE BAY COOLING AND CYCLE FLOW MATCHING

(75) Inventors: George D. Rupp, Lakewood, CA (US); Trajaen J. Troia, Hermosa Beach, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 1116 days.

(21) Appl. No.: 12/636,579

(22) Filed: Dec. 11, 2009

(65) Prior Publication Data

US 2011/0138814 A1   Jun. 16, 2011

(51) Int. Cl.
| | |
|---|---|
| F02C 7/04 | (2006.01) |
| F02C 9/18 | (2006.01) |
| F02K 3/075 | (2006.01) |
| F02K 3/077 | (2006.01) |

(52) U.S. Cl.
CPC ... F02C 7/04 (2013.01); F02C 9/18 (2013.01); F02K 3/075 (2013.01); F02K 3/077 (2013.01); Y02T 50/672 (2013.01)

(58) Field of Classification Search
CPC ............. F02K 3/02; F02K 3/025; F02K 3/04; F02K 3/06; F02K 3/062; F02K 3/065; F02K 3/068; F02K 3/072; F02K 3/075; F02K 3/077; F02K 3/105; F02K 3/115; F01D 17/105; B64D 33/02; F02C 7/042; F02C 7/057; F02C 7/04; F02C 9/18
USPC ......... 60/226.1, 226.2, 226.3, 782; 244/53 B; 137/15.1, 15.2
See application file for complete search history.

(56) References Cited

U.S. PATENT DOCUMENTS

| | | | |
|---|---|---|---|
| 2,846,844 A | 1/1956 | O'Rourke | |
| 2,958,188 A | 8/1957 | Leitner et al. | |
| 3,199,810 A | 8/1965 | Stroud et al. | |
| 3,418,808 A * | 12/1968 | Rich | F02C 7/18 |
| | | | 415/79 |
| 3,483,881 A | 12/1969 | Pike et al. | |
| 3,495,605 A | 2/1970 | Gunnarson et al. | |
| 3,797,233 A * | 3/1974 | Webb et al. | 60/791 |
| 3,841,091 A * | 10/1974 | Sargisson | F02C 3/13 |
| | | | 60/224 |
| 3,974,648 A | 8/1976 | Kepler | |

(Continued)

*Primary Examiner* — Andrew Nguyen
(74) *Attorney, Agent, or Firm* — Stetina Brunda Garred & Brucker

(57) ABSTRACT

The present invention relates to a system and method of LO airflow modulation for use with a DTSA engine. A DTSA engine is positioned within an aircraft fuselage and the second DTSA turbine fan includes it own dedicated decoupled air inlet duct that is formed co-centrically about the housing. An airflow modulator member is positioned in duct to form the duct wall when the modulator is in a closed position. The Modulator member is pivotally connected to the duct wall, and is movable by an actuator to a second open position that allows airflow to escape the third stream duct, and provide airflow to both the DTSA fan blades as well as engine bay for cooling. The method of the present invention provides airflow modulation to an aircraft employing a DTSA engine, said method including the receiving of airflow from a supersonic aircraft intake; sensing a number of parameters, including, but not limited to aircraft speed, temperature, engine load and/or altitude. Calculating an efficient amount of airflow to provide to the DTSA turbine blades thorough a decoupled airstream; and directing movement of a modulator vane located in the intake duct to vary airflow to the DTSA turbine.

14 Claims, 3 Drawing Sheets

(56) References Cited

U.S. PATENT DOCUMENTS

| | | | | |
|---|---|---|---|---|
| 3,979,903 | A * | 9/1976 | Hull et al. | 60/39.092 |
| 4,010,608 | A * | 3/1977 | Simmons | 60/226.3 |
| 4,163,366 | A * | 8/1979 | Kent | 60/226.1 |
| 4,175,384 | A * | 11/1979 | Wagenknecht et al. | 60/226.3 |
| 4,295,332 | A * | 10/1981 | Steyer et al. | 60/264 |
| 4,351,150 | A | 9/1982 | Schulze | |
| 4,934,632 | A | 6/1990 | Kim | |
| 5,214,914 | A | 6/1993 | Billig et al. | |
| 5,251,435 | A * | 10/1993 | Pauley | 60/226.1 |
| 5,351,476 | A | 10/1994 | Laborie et al. | |
| 5,357,742 | A * | 10/1994 | Miller | 60/785 |
| 5,402,638 | A * | 4/1995 | Johnson | 60/204 |
| 5,404,713 | A * | 4/1995 | Johnson | F02K 1/825 60/204 |
| 5,406,787 | A * | 4/1995 | Terrier | 60/204 |
| 5,417,056 | A * | 5/1995 | Johnson et al. | 60/260 |
| 5,655,359 | A | 8/1997 | Campbell et al. | |
| 5,809,772 | A * | 9/1998 | Giffin et al. | 60/226.1 |
| 5,867,980 | A * | 2/1999 | Bartos | 60/226.3 |
| 6,206,631 | B1 * | 3/2001 | Schilling | 415/9 |
| 6,705,569 | B1 | 3/2004 | Sanders et al. | |
| 6,901,739 | B2 * | 6/2005 | Christopherson | 60/226.3 |
| 6,942,181 | B2 | 9/2005 | Dionne | |
| 7,048,229 | B2 | 5/2006 | Sanders et al. | |
| 7,188,467 | B2 * | 3/2007 | Johnson | 60/226.1 |
| 7,216,474 | B2 | 5/2007 | Bulman et al. | |
| 7,216,475 | B2 * | 5/2007 | Johnson | 60/226.1 |
| 7,246,484 | B2 * | 7/2007 | Giffin et al. | 60/268 |
| 7,364,117 | B2 | 4/2008 | Dionne | |
| 7,395,657 | B2 * | 7/2008 | Johnson | 60/226.1 |
| 8,082,727 | B2 * | 12/2011 | Roberge | 60/226.1 |
| 8,127,528 | B2 * | 3/2012 | Roberge | 60/226.1 |
| 8,161,728 | B2 * | 4/2012 | Kupratis | 60/262 |
| 8,205,432 | B2 * | 6/2012 | Sheridan | 60/226.3 |
| 2007/0119150 | A1 * | 5/2007 | Wood et al. | 60/226.1 |
| 2007/0264133 | A1 * | 11/2007 | Schwarz et al. | 417/110 |
| 2008/0141676 | A1 * | 6/2008 | Johnson | 60/785 |
| 2009/0000265 | A1 * | 1/2009 | Kupratis | 60/39.15 |
| 2009/0000270 | A1 * | 1/2009 | Kupratis | 60/224 |
| 2009/0000271 | A1 * | 1/2009 | Kupratis | 60/224 |
| 2009/0090096 | A1 * | 4/2009 | Sheridan | 60/226.3 |
| 2010/0162682 | A1 * | 7/2010 | Lerg | 60/226.1 |
| 2010/0180572 | A1 * | 7/2010 | Wadia et al. | 60/226.1 |
| 2010/0313591 | A1 * | 12/2010 | Lents et al. | 62/259.2 |
| 2011/0150627 | A1 * | 6/2011 | Baughman | 415/1 |
| 2011/0167784 | A1 * | 7/2011 | Johnson et al. | 60/204 |
| 2011/0171007 | A1 * | 7/2011 | Johnson et al. | 415/145 |
| 2011/0262265 | A1 * | 10/2011 | Avenell | 415/115 |
| 2012/0272658 | A1 * | 11/2012 | Murphy | 60/783 |
| 2013/0177392 | A1 * | 7/2013 | Rupp et al. | 415/1 |

* cited by examiner

AIRCRAFT ENGINE AIRFLOW MODULATION APPARATUS AND METHOD FOR ENGINE BAY COOLING AND CYCLE FLOW MATCHING

CROSS-REFERENCE TO RELATED APPLICATIONS

Not Applicable

STATEMENT RE: FEDERALLY SPONSORED RESEARCH/DEVELOPMENT

Not Applicable

BACKGROUND

The present invention relates generally to a system and method for engine-bay cooling in a turbojet aircraft engine along with cycle flow matching. More particular, the present invention utilizes the structure of a decoupled third stream inlet duct on a decoupled third stream annulus ("DTSA") aircraft gas turbine engine to modulate intake airflow between the inlet decoupled inlet duct and an engine bay cooling stream.

Supersonic aircraft endure extreme high temperatures caused by propulsion systems and in-flight engine cooling is required. Many aircraft engine cooling systems employ the use of external apertures to intake cooling airflow from one or more parts of the aircraft. Such external apertures are not desirable for achieving a low observable ("LO") signature for the aircraft. Furthermore, the use of additional apertures increase complexity, cost and weight of the aircraft requiring additional mechanical systems such as additional flow paths and mechanism to draw the cooling external airflow to an engine bay.

Furthermore, variable geometries for inlets systems for cycle matching are common in supersonic aircraft. The objective of the variable geometries are to vary the airflow intake to match the airflow the engine requirements at varying speeds, engine loads and altitudes. Such variable geometries add weight, cost and complexity to the intake system. In many fixed geometry intake systems, in order to reduce weight and complexity, such systems may operate in a preferred range of cruising altitude and Mach number. In off-design operating conditions, however, the aircraft suffers from performance penalties caused by spillage drag of supplying too little or too much airflow to the aircraft engine.

As such, there is a great need in the art for an aircraft engine airflow management system that can provide engine bay cooling while maximizing the LO of the aircraft. In addition there is a great need in the art for an engine intake airflow management system that provides a simplified cycle matching that reduces the weight and complexity of existing systems.

BRIEF SUMMARY

The present invention relates to a system and method of LO airflow modulation that utilizes existing engine inlet geometry to provide engine bay cooling airflow without the need for superfluous external apertures and the mechanical systems that accompany such airflow cooling intakes. In addition to the engine bay cooling, the system and method provides a means for varying the airflow into the engine inlet to increase the mass flow ratio and reducing the drag effects of off-design range of flight by properly matching the engine airflow with the inducted inlet flow.

The present invention provides an airflow modulation system for use in aircraft DTSA engines. The DTSA engine is positioned within an aircraft fuselage, and with said engine positioned within an aircraft engine bay. The DTSA engine is a gas turbine variety formed with a generally cylindrical housing with a turbine fan positioned within the housing. A second DTSA turbine fan is provided with the blades exposed outside of the cylindrical housing. The second DTSA turbine fan has it own dedicated decoupled air inlet duct, or fan duct that is formed co-centrically about the housing. The decoupled air inlet duct is formed on the interior by the wall of the center turbine cylinder, and on the exterior by a duct wall. The duct wall terminates downstream from the inlet, and an airflow modulator member is positioned in the duct to form the duct wall when the modulator is in a closed position. The Modulator member is pivotally connected to the duct wall, and is movable by an actuator to a second open position that allows airflow to escape the third stream duct, or fan duct, and provide airflow to both the DTSA fan blades as well as engine bay or cooling duct. The airflow to the engine bay or cooling duct provides for cooling of the engine or otherwise modulates the amount of airflow to the DTSA turbine. The actuator is controlled by on-board electronics that monitor, among other things, temperature, speed, engine load and altitude. An on board processor, based upon one or more of these factors, provides instructions to the modulator actuators to provide an efficient amount of airflow to the DTSA turbine and/or the engine bay for efficient operation and cooling.

The method of the present invention provides airflow modulation to an aircraft employing a DTSA engine, said method including the receiving of airflow from a supersonic aircraft intake; sensing a number of parameters, including, but not limited to aircraft speed, temperature, engine load and/or altitude. Calculating an efficient amount of airflow to provide to the DTSA turbine blades thorough a decoupled airstream; and directing movement of a modulator vane located in the intake duct to vary airflow to the DTSA turbine. The method can provide engine cooling as well as cycle matching of the airflow to maximize efficiency of operation.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
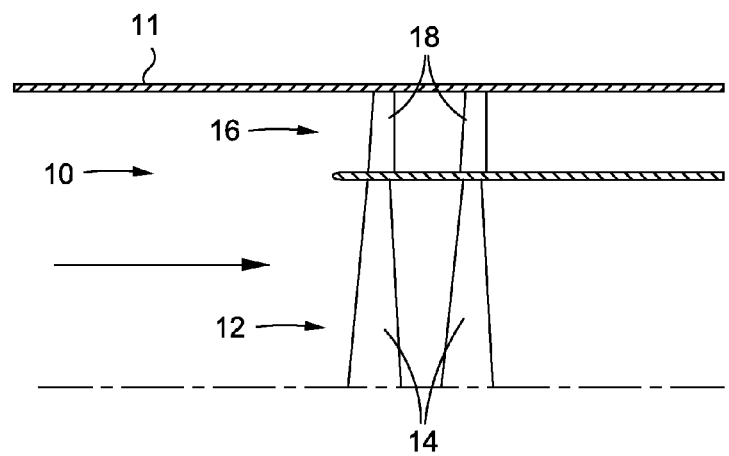
FIG. 1 is cross-sectional schematic view of a portion of a known DTSA aircraft engine system employing a third stream air flow.

Referring to FIG. 1, there is shown a cross sectional schematic view of a known DTSA engine structure having a fixed geometry inlet. Airflow enters the aircraft engine from a main inlet diffuser 10 formed by the outer walls 11 of a DTSA engine. The DTSA engine is mounted within the fuselage of a supersonic aircraft and is placed in fluid communication with an inlet diffuser 10 which receives airflow from a supersonic air intake (not shown). The center turbine inlet 12, which receives airflow from the inlet diffuser 10, provides airflow to the turbo fan blades 14 of the center turbine engine. A second airflow duct 16 also receives airflow from the main inlet diffuser 10 to provide airflow to the third stream DTSA fan blades 18. In this configuration, airflow from the diffuser 10 is directed to both the center turbine inlet 12 and the third stream duct 16 and as such, the intake airflow is not modulated to enable cycle matching of the engine to aircraft speed when operating out the optimum range or otherwise redirect airflow to an engine bay cooling system. Examples of DTSA engines employing third stream airflow systems are described in detail at U.S. Pat. No. 7,395,657, the entire substance of which is incorporated herein by reference.

Figure 2:
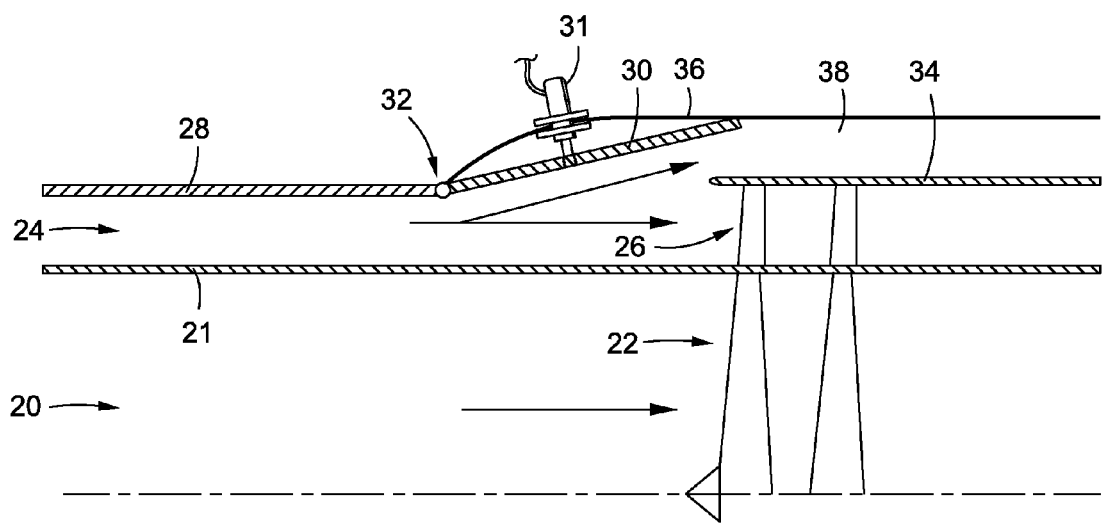
FIG. 2 is a cross sectional schematic view of the system of the present invention employing a directional vane within a decoupled airstream of a DTSA engine.

Referring particularly to FIG. 2, there is shown a cross sectional schematic view of the air modulation system of the present invention. In the configuration of the present invention, the modified DTSA engine is situated within the fuselage of an aircraft, and placed in fluid communication with a supersonic air intake (not shown) through the main inlet diffuser 20. The main inlet diffuser 20 receives airflow from a supersonic air intake (not shown) to direct airflow to a center turbine inlet 22. A third stream air duct, or fan duct 24 also receives airflow from the supersonic air intake (not shown), however, the third stream transfer duct 24 is completely decoupled from the main inlet diffuser 20. As such, the third stream transfer duct 24 provides airflow to a DTSA fan blades at interface 26. The main inlet diffuser 20 is bounded by a diffuser wall 21 which segregates the main inlet diffuser and main fan stream from the third stream transfer duct 24. The third stream transfer duct 24 is formed on the interior side by the diffuser wall 21 and on the external side by duct wall 28. A vane 30 is pivotally connected at a hinge point 32 along the outer duct wall 28. In the closed position (not shown) the vane 30 contacts the engine third stream exterior wall or common wall 34. As such, the exterior duct wall 28, the vane 30 and the outer engine third stream wall 34, when the vane 30 is in the closed position forms a decoupled third stream airflow to the DTSA fan blades at interface 26. At the hinge point 32 an engine bay wall 36 flares outward to form the engine bay, or cooling duct 38. As shown in FIG. 2, the vane 30 is an open position allowing airflow from the third stream transfer duct 24 to flow to both the DTSA interface 26 as well as the engine bay 38 to provide engine bay cooling.

Figure 3:
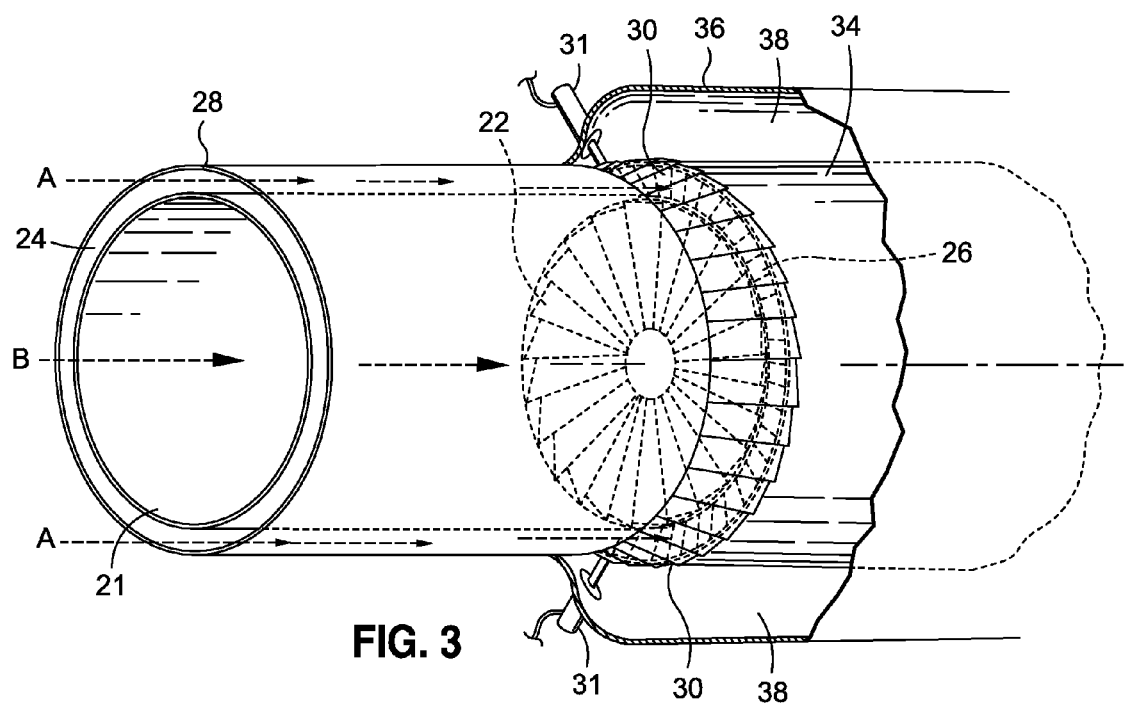
FIG. 3 is a perspective view of vane system used with the decoupled airstream of a DTSA engine where the vane is in the first position.
Figure 4:
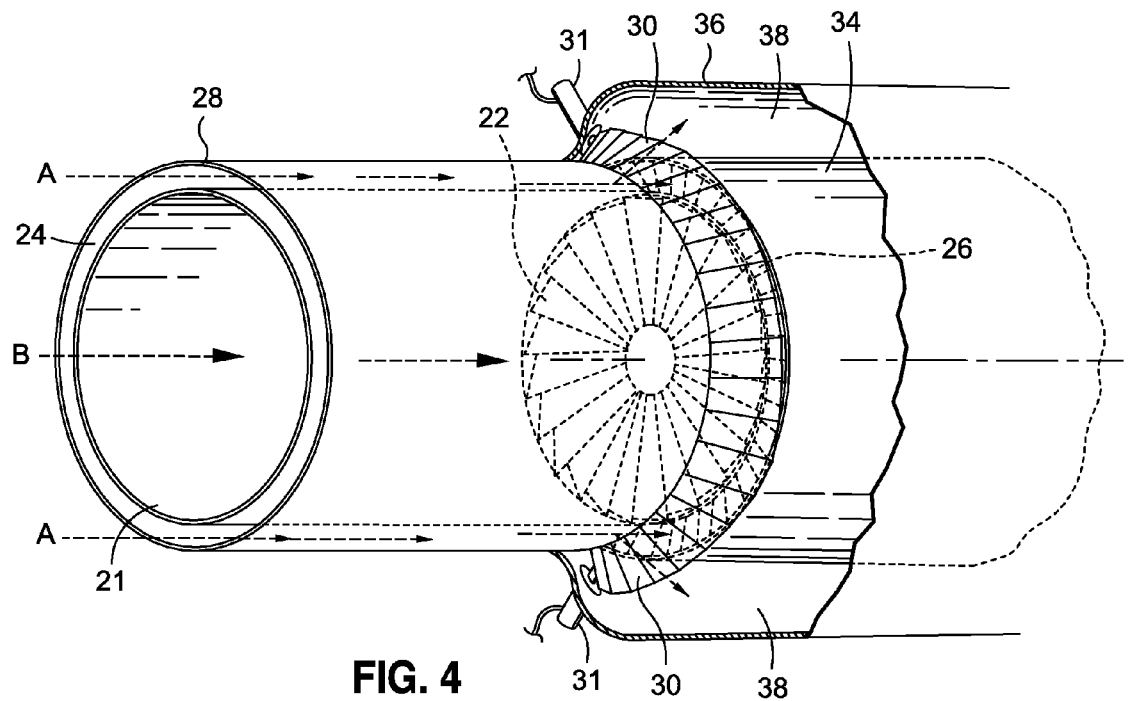
FIG. 4 is a perspective view of the vane system used with the decoupled airstream of a DTSA engine where the vane is in a second position.

The vane 30 is moved from an open position to a close position by externally mounted actuators 31. The engine requires different amounts of airflow, and the different degrees of cooling depending on different stages of flight operation. The vane 30 of the present invention improves efficiency over an entire flight regime as opposed to most conventional propulsion systems which are optimized for cruise flight conditions. The vane 30 allows varying amounts of airflow to the DTSA turbine blades as well as varying amounts of cooling airflow to the engine bay 38. The vane 30 may be controlled through actuators 31 interconnected to a computer based system which would regulate the opening and closing of the vane 30 based upon a number of parameters, including but not limited to, the engine power setting, air speed or mach number and/or altitude. Actuators 31 will include an array of actuators 31 that interface an array of circumferentially positioned vanes 30 (as shown in FIGS. 3 and 4). The vane 30 is rotated about the hinge by contacting a telescoping drive shaft attached to the actuators 31. Mechanical activation of the actuators 31 is scheduled based upon flight conditions. The conditions can be pre-programmed to certain flight conditions and can also be coupled to an active control systems including sensors. Spillage drag reduction is achieved by the method and system of the present invention by properly matching the inlet flow in the third stream transfer duct 24 at off design conditions. For example, at subsonic speeds the vane 30 can be adjusted to achieve spillage drag reduction. The total airflow through the third stream transfer duct 24 and through the entire engine third stream increases as the vane 30 is opened, increasing the inlet match flow ratio and reducing the inlet drag at subsonic loiter conditions. Thus, the configuration of the present invention eliminates the use of complex external aperture engine bay cooling induction system and provides significant LO benefits. The vanes 30 are circumferentially formed around the turbine housing 28, and may include a plurality of members 30 that overlap to form a series of overlapping rigid members (as shown in FIGS. 3 and 4). Each of the vanes are formed of aluminum or rigid composite material. The vanes can also be formed from specialty polymer having sufficient rigidity to deflect airflow. The vane 30 must be heat resistant to extreme temperatures.

Referring particularly to FIGS. 3 and 4 there is shown the air modulation system of the present invention with the vane 30 of the third stream air duct 24 in a closed position, and in FIG. 4, the vane 30 in an open position allowing airflow into the engine bay 38. As shown in FIG. 3, the main inlet diffuser 20 provides airflow B into the center turbine inlet 22. With the vane 30 in the closed position airflow A traverses the air inlet duct 24 to travel the length of the third airstream duct 24 into the DTSA fan blade interface 26. In the configuration as shown in FIG. 3 the decoupled airstream 24 provides airflow A only to the DTSA inlet 26.

Figure 5:
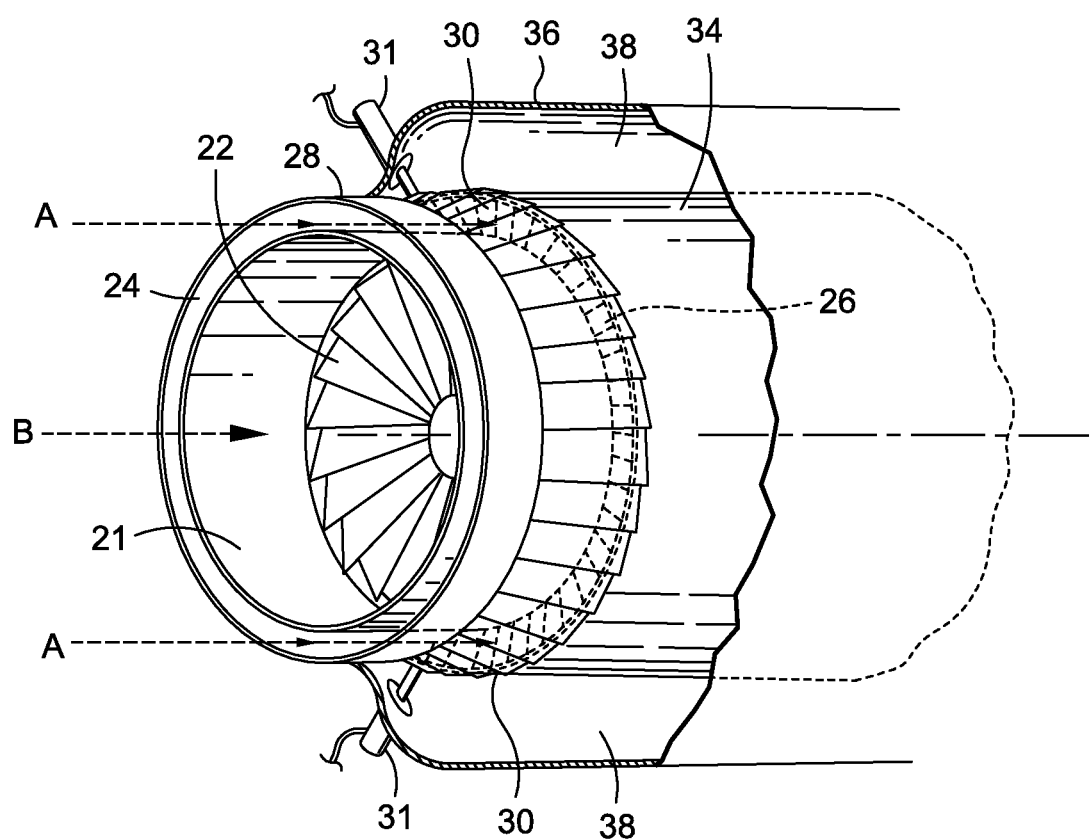
FIG. 5 is a perspective view of an alternate embodiment of the present invention showing the use of a shortened decoupled airstream.

Referring particularly to FIG. 4, the actuators 31 are positioned circumferentially about the center turbine are actuated to pull the vane 30 outwardly to permit airflow A in air duct 24 to pass into the engine bay 38 and the DTSA interface 26. In this configuration, less airflow A is provided to the DTSA fan blade interface 26 which may be desirable in certain operating conditions, and additionally may provide airflow to the engine bay 38 to aid in engine cooling. It is contemplated that the duct wall 28 and the diffuser wall 21 may extend to the main inlet diffuser to the supersonic air intake (not shown) which provides air to both the third stream air duct 24 and center turbine inlet 22. The invention contemplates, as shown in FIG. 5, that the combination of the duct wall 28 and the diffuser wall 21 my have varying lengths, but in each instance is in fluid communication with a supersonic intake (not shown). The air modulation system of the present invention as shown in FIG. 4 is a perspective view of the portion cross sectional view as shown in FIG. 2.

Referring particularly to FIG. 5, there is shown an alternate embodiment of the air modulation system of the present invention. The alternate embodiment of FIG. 5 is essentially the identical construction to that shown in FIGS. 3 and 4, except that the duct wall 28 and the diffuser wall 21 are shortened. The configuration of FIG. 5 may be utilized in an aircraft engine system where it is desirable to minimize the direct airflow from supersonic air intake (not shown). In this regard, the airflow A and B may result in a single flow path from the air intake (not shown) that is then divided at a point closer to the center turbine inlet 22 to create the third stream air duct 24.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. An airflow modulation system for use in aircraft propulsion, the airflow modulation system comprising:
   a turbine engine disposed at least partially within an engine bay defined by an engine bay wall, the turbine engine including:
   a first fan duct defined at an outer diameter by a center housing, the center housing having an upstream end;
   a second fan duct including a first portion defined by an annular duct wall formed concentrically about a first portion of the center housing, and a second portion formed concentrically about a second portion of the center housing, wherein the annular duct wall has an upstream end and a downstream end;
   an annular cooling duct formed concentrically about at least a portion of the second fan duct, wherein the cooling duct and the second fan duct are at least partially defined by a common wall portion formed concentrically about the second portion of the center housing, wherein the annular duct wall and the common wall portion are radially aligned with one another with respect to a longitudinal axis of the turbine engine, and wherein the upstream end of the annular duct wall surrounds the upstream end of the center housing; and
   an airflow modulator mounted on the downstream end of the annular duct wall and operably associated with the second fan duct and the cooling duct, the airflow modulator movable between a first position,
   wherein the airflow modulator directs airflow to the second fan duct, and at least a second position,
   wherein the airflow modulator directs airflow to both the second fan duct and the cooling duct.

2. The airflow modulation system of claim 1, wherein the airflow modulator includes a vane pivotally connected to the annular duct wall.

3. The airflow modulation system of claim 2, wherein the vane is pivotally connected at a hinge point, and wherein at the hinge point the engine bay wall flares outward to form the engine bay.

4. The airflow modulation system of claim 2, wherein the vane is movable between the first position and the at least the second position by an actuator operably associated with the engine bay wall.

5. The airflow modulation system of claim 1, wherein at least a portion of the center housing extends forwardly of the engine bay wall.

6. The airflow modulation system of claim 1, wherein airflow within the cooling duct provides cooling of either one, or both, of the aircraft engine and the engine bay.

7. An airflow modulation system for use in aircraft propulsion, the airflow modulation system comprising:
   a turbine engine disposed at least partially within an engine bay defined by an engine bay wall, the turbine engine including:
   a first fan duct defined at an outer diameter by a center housing, the center housing including an upstream end, a first portion disposed upstream of first fan blades and a second portion disposed downstream of the first fan blades;
   a second fan duct including a first portion defined by an annular duct wall having an upstream end and a downstream end, the annular duct wall formed concentrically about at least a portion of the first portion of the center housing, and a second portion formed concentrically about at least a portion of the second portion of the center housing, wherein the first portion of the second fan duct has a central longitudinal axis that is longitudinally aligned with a central longitudinal axis of the second portion of the second fan duct;
   an annular cooling duct formed concentrically about at least a portion of the second fan duct, wherein the cooling duct and the second fan duct are at least partially defined by a common wall portion formed concentrically about the at least a portion of the second portion of the center housing, and wherein the upstream end of the annular duct wall surrounds the upstream end of the center housing; and
   an airflow modulator mounted on the downstream end of the annular duct wall and operably associated with the second fan duct and the cooling duct, the airflow modulator movable between a first position, wherein the airflow modulator directs airflow to the second fan duct and blocks flow to the cooling duct, and at least a second position, wherein the airflow modulator directs airflow to both the second fan duct and the cooling duct, wherein airflow within the cooling duct provides cooling of either one, or both, of the aircraft engine and the engine bay.

8. The airflow modulation system of claim 7, wherein the airflow modulator includes a vane pivotally connected to the annular duct wall.

9. The airflow modulation system of claim 8, wherein the vane is pivotally connected at a hinge point, and wherein at the hinge point the engine bay wall flares outward to form the engine bay.

10. The airflow modulation system of claim 8, wherein the vane is movable between the first position and the at least the second position by an actuator operably associated with the engine bay wall.

11. The airflow modulation system of claim 1, wherein the annular duct wall and the common wall portion are radially aligned with one another along the entire lengths thereof with respect to the longitudinal axis of the turbine engine.

12. The airflow modulation system of claim 11, wherein the center housing has a generally cylindrical shape.

13. The airflow modulation system of claim 1, wherein the annular duct wall and the common wall portion are radially aligned with one another with respect to the longitudinal axis of the turbine engine to direct airflow into the second fan duct when the airflow modulator is the first position.

14. The airflow modulation system of claim 7, wherein the center housing has a generally cylindrical shape.

\* \* \* \* \*